UNITED STATES PATENT OFFICE.

RAYMOND B. PRICE, OF NEW YORK, N. Y., ASSIGNOR TO RUBBER REGENERATING COMPANY, A CORPORATION OF INDIANA.

RUBBER BOOT OR SHOE AND PROCESS OF MANUFACTURING SAME.

1,211,962.   Specification of Letters Patent.   Patented Jan. 9, 1917.

No Drawing.   Application filed October 27, 1913. Serial No. 797,634.

*To all whom it may concern:*

Be it known that I, RAYMOND B. PRICE, a citizen of the United States, residing in the city of New York, county and State of New York, have invented certain new and useful Improvements in Rubber Boots or Shoes and Processes of Manufacturing Same, of which the following is a full, clear, and exact disclosure.

This invention relates to rubber boots and shoes and to the process of manufacturing same, but more particularly to such processes as contemplate the building up of the article upon a form instead of using a mold, and to types of boots and shoes that are composed of a combination of rubber supporting and strengthening layers of fabric and vulcanized rubber.

The primary object of this invention is the devising of means whereby the finished boot or shoe will include vulcanized rubber associated with a layer (or layers) of rubber supporting and strengthening fabric or fiber which is of itself a continuous integral unit having a conformation substantially similar to that of the article or a portion thereof to be produced and which may be graduated as to its flexibility, strength, thickness, compactness, etc., in any predetermined manner to meet the conditions of wear to which the article is subjected when in service.

The fabric used for supporting and strengthening the rubber has been formerly cut from flat sheets and then shaped to the many abrupt irregularities and curvatures of the form by subjecting it to such undue stretching at certain parts and crowding or puckering at others as will attain these ends. There has been no attempt to make the respective layers of fabric as a continuous integral unit. They are usually formed of two or more independent pieces and the abutting edges of adjacent portions are left free from each other and more or less separated, thereby adding nothing whatever to the support or strength of the rubber which spans the gaps between them.

Fragmental cuttings of fabric are added to the form for the purpose of reinforcing the boot or shoe at the necessary parts, thereby forming a body portion of graduated thickness. This at most produces a patchwork effect, which is clearly evidenced from the outer side of the boot or shoe, and instead of meeting the condition of excessive wear, often results in shifting the wear to some other part. The securing of the reinforcing pieces to the body of the article also requires the use of additional rubber stock.

These objectionable features are practically eliminated in boots and shoes made according to the present invention. The rubber supporting and strengthening layer of fabric or fibrous material which is used is, in its primary state, a continuous integral unit having a conformation substantially similar to the boot or shoe to be produced. This is drawn onto the form, and may, if desired, be made slightly smaller so that it will fit snugly. When desired this layer of material may be provided with a slit (or slits) to facilitate its being placed upon the form; also more than one layer of material may be used. The layer of material is preferably composed of differently constructed portions to vary its thickness, compactness, flexibility, strength, etc., in a predetermined graduated manner to meet the various requirements as to wear which the boot or shoe is subjected to.

The layer (or layers) of fabric is associated with rubber in any preferred or well known manner and the rubber finally vulcanized.

Having thus described my invention, what I claim and desire to protect by Letters Patent is:

1. A boot or shoe comprising a knitted seamless fabric lining completely shaped to conform to the inner surface of the finished article under substantially equal tension of its threads at all points, and an outer covering of rubber vulcanized to said fabric.

2. A boot or shoe comprising a seamless fabric lining completely preshaped to conform to the inner surface of the finished article under substantially equal tension of its threads at all points and having wearing portions of greater thickness than the main body of said fabric, and an outer covering of rubber vulcanized to said fabric.

3. The method of manufacturing boots or shoes which comprises, applying to a suitable last or form a seamless fabric completely preshaped to conform closely to the surface of said last at all points and under substantially equal tension of its threads, applying to said fabric a covering of vulcanizable rubber, and then vulcanizing the article so constructed while maintaining said fabric under uniform tension.

Signed at the city, county, and State of New York, this 22nd day of October, 1913.

RAYMOND B. PRICE.

Witnesses:
CHARLOTTE M. SCHULE,
JOHN J. CASEY.